United States Patent
Berger et al.

(10) Patent No.: US 7,377,154 B2
(45) Date of Patent: May 27, 2008

(54) MONITORING OF EXHAUST GAS LIMITING VALUES

(75) Inventors: Joachim Berger, Winterbach (DE); Rainer Strohmaier, Stuttgart (DE); Bernard Kamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 11/490,711

(22) Filed: Jul. 20, 2006

(65) Prior Publication Data

US 2007/0033925 A1 Feb. 15, 2007

(30) Foreign Application Priority Data

Jul. 22, 2005 (DE) .................. 10 2005 034 247

(51) Int. Cl.
*G01M 15/00* (2006.01)
(52) U.S. Cl. .................... 73/118.1; 73/23.31
(58) Field of Classification Search ............. 73/23.31, 73/23.32, 116, 117.2, 117.3, 118.1
See application file for complete search history.

(56) References Cited

U.S. PATENT DOCUMENTS 7,049,595 B2 * 5/2006 Kansakoski et al. ..... 250/338.5
2007/0186540 A1 * 8/2007 Hahn .................... 60/285

\* cited by examiner

*Primary Examiner*—Eric S McCall
(74) *Attorney, Agent, or Firm*—Kenyon & Kenyon LLP

(57) ABSTRACT

In a method for monitoring an exhaust gas limiting value of an internal combustion engine using an engine controller, the engine controller has at least one exhaust gas sensor, and an error signal is output when the exhaust gas limiting value is exceeded. If the emissions predicted for the present driving state are ascertained with the aid of an engine model and compared to the signal of the exhaust gas sensor or a comparison value for the emission derived therefrom, the prescribed driving cycle may be taken into account when certifying a limiting value monitoring system and a defective system may be reliably recognized in practical operation even in atypical driving states without resulting in erroneous triggering of error signals.

14 Claims, 2 Drawing Sheets

MONITORING OF EXHAUST GAS LIMITING VALUES

FIELD OF THE INVENTION

The present invention relates to monitoring an exhaust gas limiting value of an internal combustion engine using an engine controller, the engine controller having at least one exhaust gas sensor, and an error signal being output when the exhaust gas limiting value is exceeded.

BACKGROUND INFORMATION

Such monitoring of exhaust gas limiting values is being increasingly required by legislation. A mass of a pollutant such as particles or nitrogen oxide is established for a distance traveled based on a standard driving cycle; when this mass is exceeded, the vehicle's driver must be advised of the emission problem. In practical driving operation, it must be recognized, in any driving cycle, when the limit is exceeded, while the definition of a vehicle to be considered non-defective or defective must be evaluated according to the standardized driving cycle. Furthermore, making a distinction between non-defective and defective vehicles is difficult, because the difference between a still allowable emission and a vehicle to be considered defective is slight. Thus, U.S. legislation provides that a defect is only 1.5 times the allowable certification limiting value for exhaust gas monitoring. At the same time, it must be prevented that monitoring classifies non-defective vehicles in some driving situations as defective. For this reason, the use of a fixed limiting value, independent of the driving situation, is not a viable method. If the vehicle is being driven under full load, emissions may occur such that a fixed limiting value would be exceeded, although the vehicle is to be regarded as non-defective according to the standard driving cycle. The reverse situation is also conceivable in the case of a fixed limit. A defective vehicle, which is operated at low emission by suitable driving behavior, may remain undetected for a long time, while it would not pass an official test.

SUMMARY OF THE INVENTION

The object of the present invention is to provide monitoring of the exhaust gas limiting values of a vehicle having an internal combustion engine which allows a reliable distinction to be made between non-defective and defective vehicles both in a standard driving cycle and in practical operation.

The object is achieved by predicted emissions being ascertained for the present driving state using an engine model and compared with the signal of the exhaust gas sensor or a comparison value for the emission derived therefrom. The prescribed driving cycle may be taken into account by the modeling when certifying a limiting value monitoring system, and a defective system may be reliably recognized in practical operation even in driving states outside the driving cycle, without resulting in erroneous triggering of error signals.

If measured engine variables available in the engine controller and/or additional measured engine variables and/or exhaust gas values are taken into account in the model, modeling may be improved to the point where the allowable emission may be reliably modeled for the driving states occurring in practice.

An embodiment that is particularly easy to implement provides that the measured emission to the predicted emission ratio is formed for comparison and, if a preset threshold value is exceeded, the error signal is output, or the predicted emission to measured emission ratio is formed and, if this ratio drops below a preset threshold value, the error signal is output.

As an alternative, the ratio of the difference between the predicted emission and the measured emission to the predicted emission is formed, or the ratio of the difference between the predicted emission and the measured emission to the measured emission is formed for comparison and, in the event of a negative result below a preset limit, the error signal is output.

If the quantities mass flow of an exhaust gas component, concentration of an exhaust gas component, particle flow of an exhaust gas component, mass of an exhaust gas component emitted in a certain period of time, or particle count emitted in a certain period of time are used as the emission, the modeled limiting value may be compared with the emission values which may be ascertained by commercially available sensors routinely used in the automobile industry.

If an error signal is not triggered until after multiple comparisons have been made with the result that the allowable limiting value has been exceeded, false triggering of error signals may be reduced.

The accuracy of detection of a defective vehicle may also be improved while erroneous triggering of the system is prevented by averaging the calculated emission and/or the measured emission over a certain period of time, since short-term fluctuations in the emission are evened out in this way.

To make a reliable distinction between non-defective and defective vehicles, the exhaust gas limiting value may be calculated and compared with the signal of the exhaust gas sensor only at operating points of the engine at which a particularly accurate calculation of the exhaust gas limiting value or a particularly accurate measurement by the exhaust gas sensor is possible.

Erroneous triggering events in special driving situations may be reduced by assigning greater weights to values at operating points of the engine at which a particularly accurate calculation of the exhaust gas limiting value or a particularly accurate measurement by the exhaust gas sensor is possible.

The method may also be extended to the use of collecting exhaust gas sensors such as soot sensors by multiplying the calculated emission by an exhaust gas volume flow and integrating it when a collecting principle is used for the exhaust gas sensor.

In a refinement of the method, individual components of an exhaust gas treatment system are monitored by comparing a signal of an exhaust gas sensor situated in the exhaust gas stream upstream from the component of the exhaust gas treatment system with the signal of a second exhaust gas sensor downstream from the component, an error signal being output in the event of insufficient function of the component.

Monitoring of the function of the exhaust gas sensor is made possible by inferring a malfunction of the exhaust gas sensor from the comparison of the calculated emission and measured emission and outputting an error signal.

DETAILED DESCRIPTION

Figure 1:
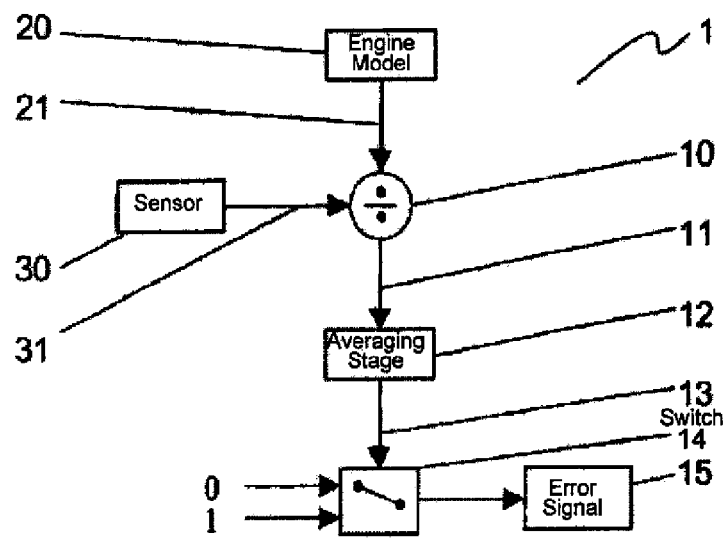
FIG. 1 shows a limiting value monitoring system for an exhaust gas sensor.

FIG. 1 shows the embodiment according to the present invention of a monitoring system 1 for exhaust gas limiting values. A predicted emission 21, corresponding to the emission of a non-defective vehicle in this driving situation, is derived from an engine model 20. An exhaust gas sensor 30 outputs a signal corresponding to measured emission 31. This may be the nitrogen oxide concentration or the particle flow of an exhaust gas component such as soot particles. Degree of emission 11 is formed in the comparison stage from predicted emission 21 and measured emission 31. It may be formed, for example, from the ratio of measured emission 31 to predicted emission 21. In an averaging stage 12, degree of emission 11 may be averaged over a certain time period resulting in averaged degree of emission 13 to even out short-term fluctuations. A threshold value switch 14 generates an error signal 15 if a preset limiting value for degree of emission 11 or averaged degree of emission 13 is exceeded. A "malfunction indicator lamp" informing the vehicle's driver that the allowable emission has been exceeded may be turned on via error signal 15.

Alternatively, comparison stage 10 may form degree of emission 11 from the ratio of measured emission 31 to predicted emission 21, and issue an error signal 15 if a preset threshold value is exceeded. In a further embodiment, the ratio of predicted emission 21 to measured emission 31 is formed, and an error signal 15 is issued if this ratio is less than a preset threshold value. Forming the ratio of the difference between predicted emission 21 and measured emission 31 to predicted emission 21 or forming the ratio of the difference between predicted emission 21 and measured emission 31 to measured emission 31 is also suitable for forming degree of emission 11. In this embodiment, error signal 15 is output in the event of a negative result below a preset limit.

Figure 2:
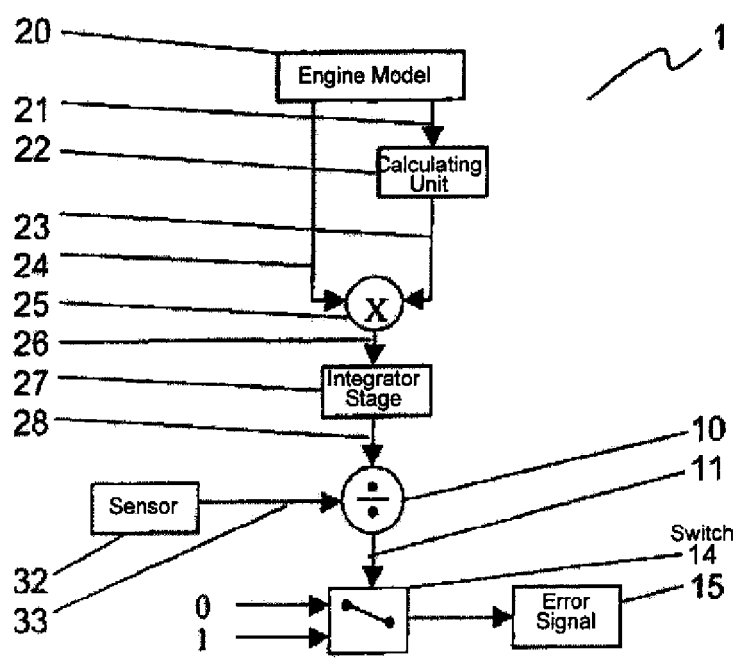
FIG. 2 shows the limiting value monitoring system for a collecting threshold value switch.

FIG. 2 shows monitoring system 1 when a collecting sensor 32 is used such as employed for detecting soot particles, for example. Predicted emission 21, from which predicted limiting value 23 is formed in limiting value calculating unit 22, is formed from engine model 20. This stage takes into account U.S. legislation, which mandates that the allowable limiting value be 1.5 times the certification limiting value. To form a predicted mass flow 26, predicted limiting value 23 is multiplied by an exhaust gas volume flow 24 from engine model 20 in a multiplication stage 25. Predicted mass flow 26 is integrated in integrator stage 27 to yield predicted mass 28. Predicted mass 28 is compared to measured mass 33 of collecting sensor 32 in comparison stage 10. If threshold value switch 14 determines that the limiting value has been exceeded, error signal 15 is triggered.

Figure 3:
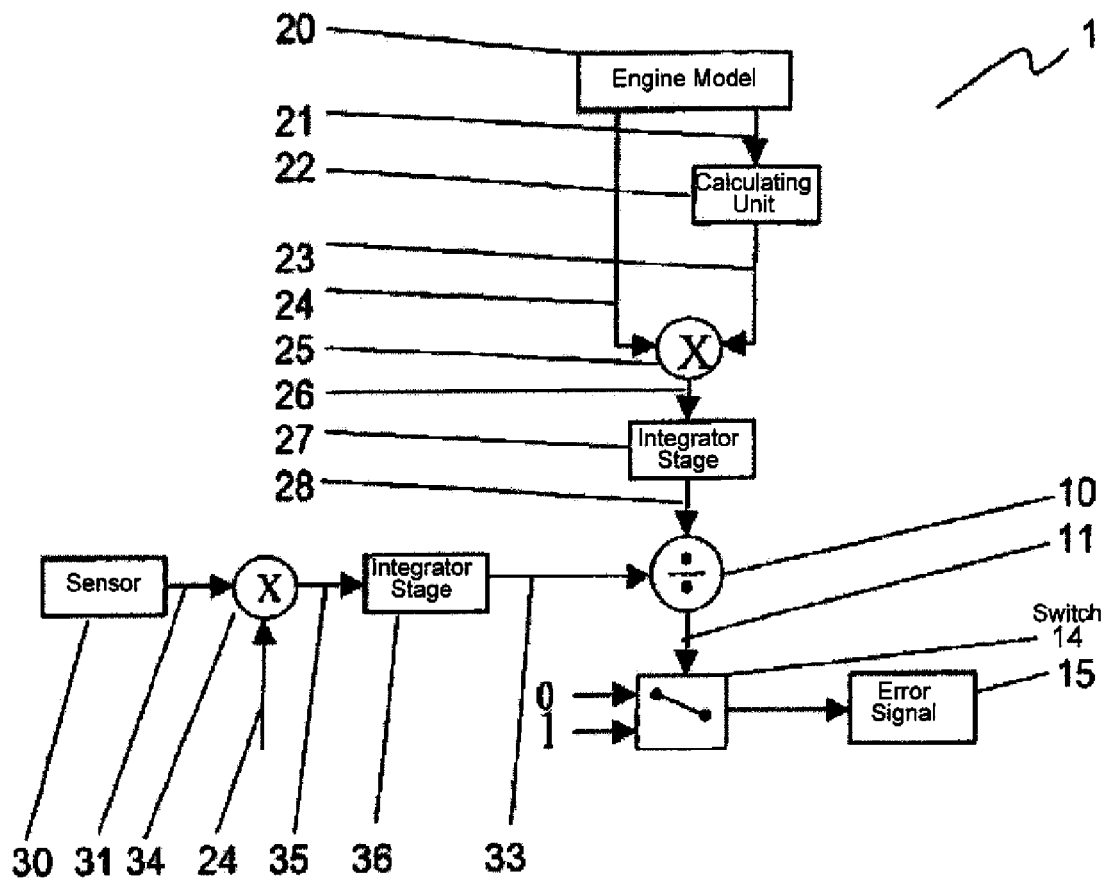
FIG. 3 shows the limiting value monitoring system for an exhaust gas sensor and determining the collected mass.

FIG. 3 shows the embodiment of monitoring system 1, in which measured emission 31 of sensor 30, sensitive to the mass flow, is used for comparison with predicted mass 28. Measured emission 31 is multiplied by exhaust gas volume flow 24 in a multiplier 34 to yield measured mass flow 35. An integrator stage 36 forms measured mass 33 from measured mass flow 35. Measured mass 33 is compared to predicted mass 28 in comparison stage 10, as depicted in FIG. 2. Degree of emission 11 thus formed is evaluated by the threshold switch, which is able to trigger an error signal 15 when the limiting value has been exceeded.

What is claimed is:

1. A method for monitoring an exhaust gas limiting value of an internal combustion engine using an engine controller, the engine controller having at least one exhaust gas sensor, comprising:

ascertaining a predicted emission for a present driving state with the aid of an engine model;

comparing the predicted emission to one of a signal of the exhaust gas sensor and a comparison value of an emission, the comparison value derived from the signal of the exhaust gas sensor;

determining, based on the comparing, whether the exhaust gas limiting value has been exceeded; and outputting an error signal responsive to the determination being that the exhaust gas limiting value has been exceeded.

2. The method as recited in claim 1, wherein at least one of measured engine variables present in the engine controller, additional measured engine variables, and measured exhaust gas values are taken into account in the model.

3. The method as recited in claim 1, wherein one of:

(a) a first ratio of a measured emission to the predicted emission is formed and it is determined that the exhaust gas limiting value is exceeded if the first ratio exceeds a first preset threshold value; and (b) a second ratio of the predicted emission to the measured emission is formed and it is determined that the exhaust gas limiting value is exceeded if the second ratio is less then a second preset threshold.

4. The method as recited in claim 1, wherein:

one of:

a first ratio of a difference between the predicted emission and a measured emission to the predicted emission is formed; and a second ratio of a difference between the predicted emission and the measured emission to the measured emission is formed; and the error signal is output in an event of a negative result of the one of the first ratio and the second ratio below a preset limit.

5. The method as recited in claim 1, wherein one of a mass flow of an exhaust gas component, a concentration of an exhaust gas component, a particle flow of an exhaust gas component, a mass of an exhaust gas component emitted during a certain period of time, and a particle count of an exhaust gas component emitted during a certain period of time is used as the emission.

6. The method as recited in claim 1, wherein the error signal is output conditional upon that multiple comparisons have been made that result in the determination that the exhaust gas limiting value has been exceeded.

7. The method as recited in claim 1, wherein a calculation of the exhaust gas limiting value and a comparison to the signal of the exhaust gas sensor is only carried out at operating points of the engine at which one of a particularly accurate calculation of the exhaust gas limiting value and a particularly accurate measurement by the exhaust gas sensor is possible.

8. The method as recited in claim 1, further comprising:

using a collecting principle for the exhaust gas sensor, wherein a calculated emission is multiplied by an exhaust gas volume flow and integrated.

9. The method as recited in claim 1, wherein:

individual components of an exhaust gas treatment system are monitored by comparing a signal of the exhaust gas sensor, the exhaust gas sensor being situated in the exhaust gas stream upstream from a component of the exhaust gas treatment system, to a signal of a second exhaust gas sensor downstream from the component, and in the event of an insufficient function of the component, the error signal is output.

10. The method as recited in claim 1, wherein a malfunction of the exhaust gas sensor is inferred from the comparison, and the error signal is output responsive to the inference.

11. The method as recited in claim 1, further comprising:
averaging at least one of a calculated emission and a measured emission over a preset period of time.

12. The method as recited in claim 11, wherein, when averaging, a higher weight is assigned to values at operating points of the engine at which one of a particularly accurate calculation of the exhaust gas limiting value and a particularly accurate measurement by the exhaust gas sensor is possible.

13. A method for monitoring an exhaust gas limiting value of an internal combustion engine using an engine controller, the engine controller having at least one exhaust gas sensor, comprising:
ascertaining a predicted emission for a present driving state with the aid of an engine model;
comparing the predicted emission to one of a signal of the exhaust gas sensor and a comparison value of an emission, the comparison value calculated as a difference between the predicted emission and the signal of the exhaust gas sensor;
determining, based on the comparing, whether the exhaust gas limiting value has been exceeded; and
responsive to the determination being that the exhaust gas limiting value has been exceeded, outputting, by an indicator lamp, an error signal.

14. A method for monitoring an exhaust gas limiting value of an internal combustion engine using an engine controller, the engine controller having at least one exhaust gas sensor, comprising:
ascertaining a predicted emission for a present driving state with the aid of an engine model;
comparing the predicted emission to one of a signal of the exhaust gas sensor and a comparison value of an emission, the comparison value calculated by multiplying the signal of the exhaust gas sensor by an exhaust gas volume flow value;
determining, based on the comparing, whether the exhaust gas limiting value has been exceeded; and
responsive to the determination being that the exhaust gas limiting value has been exceeded, outputting, by an indicator lamp, an error signal.

* * * * *